June 4, 1940.　　R. D. DELAMERE ET AL　　2,203,132
VISCOSIMETER
Filed June 7, 1937　　3 Sheets-Sheet 2
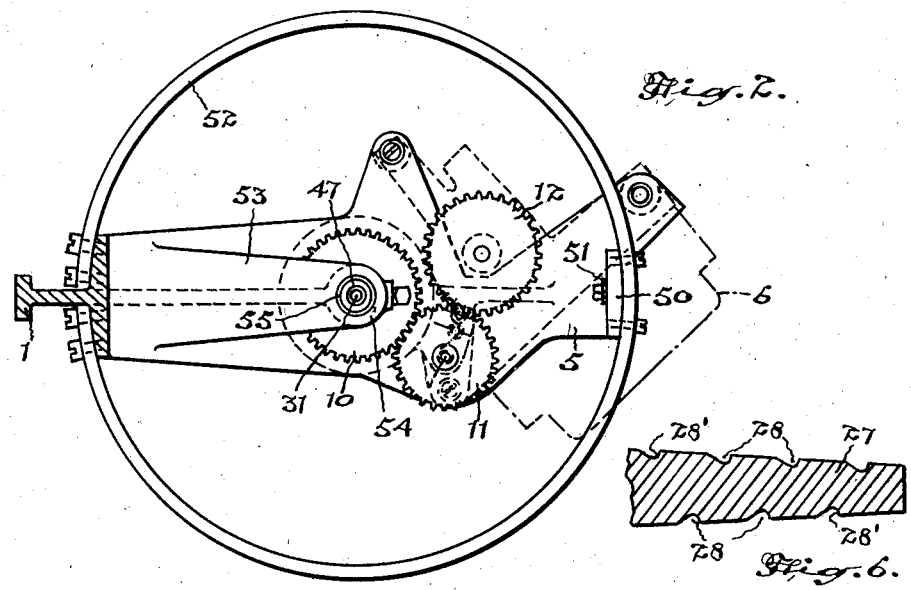
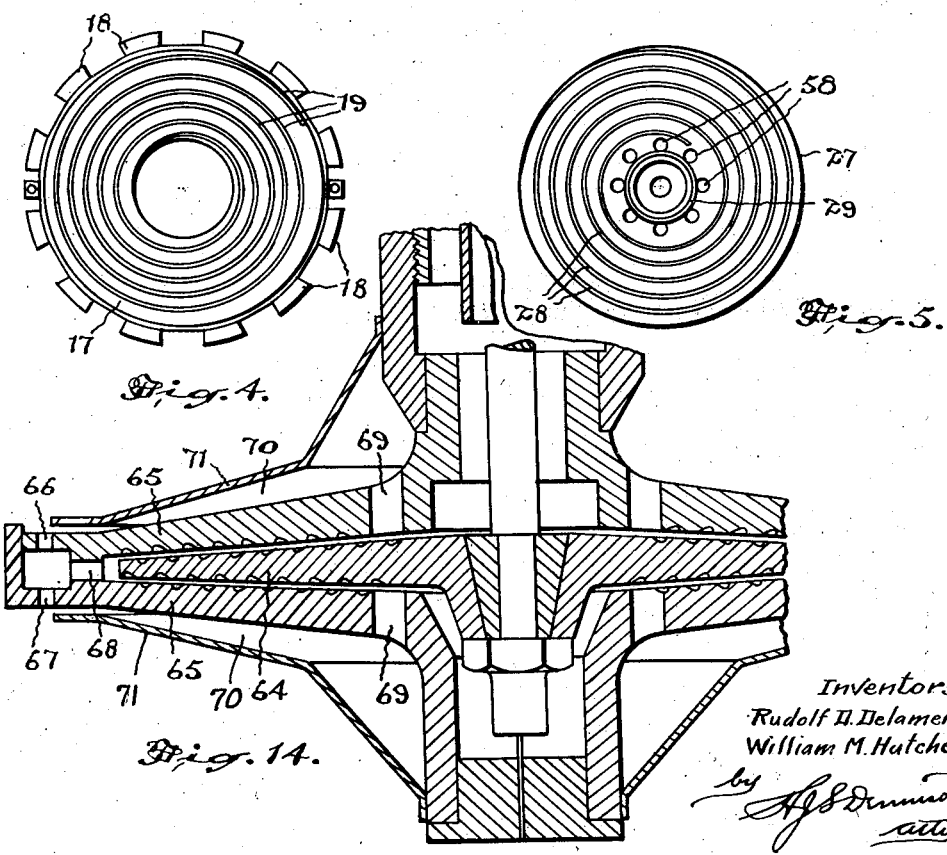
Inventors.
Rudolf D. Delamere.
William M. Hutcheon.

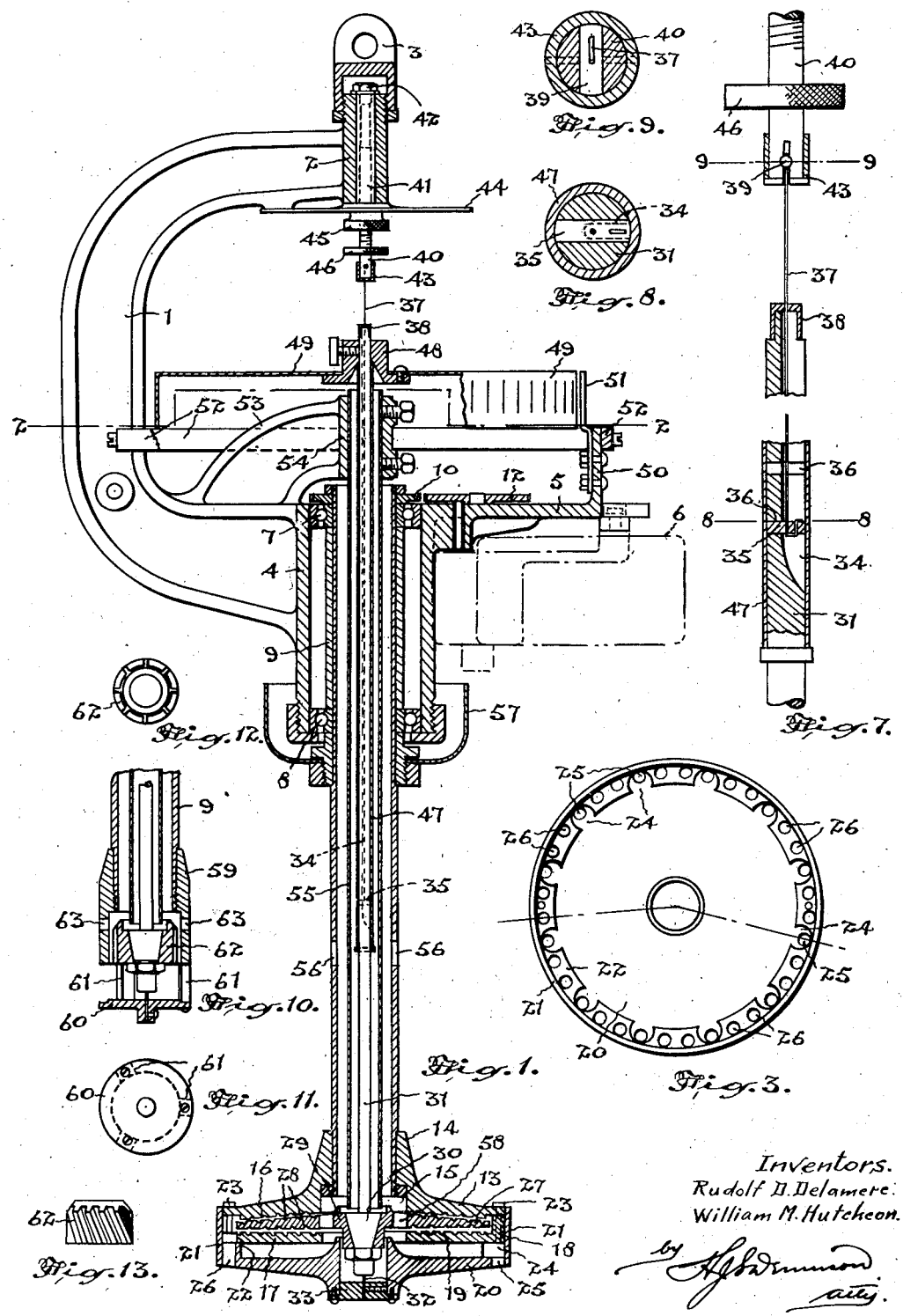

Patented June 4, 1940

2,203,132

UNITED STATES PATENT OFFICE

2,203,132

VISCOSIMETER

Rudolf D. Delamere and William M. Hutcheon, Toronto, Ontario, Canada, assignors to A. R. Clarke & Company, Limited, Toronto, Ontario, Canada Application June 7, 1937, Serial No. 146,848

18 Claims. (Cl. 265—11)

The principal objects of this invention are to enable the manufacturers of liquid materials to determine the viscosity of the liquid at any point in the course of its manufacture, or to enable the testing of any liquid material to determine the viscosity thereof under any desired condition of mass or temperature.

A further important object is to provide a very compact and simple form of instrument which may be readily carried about and utilized in measuring the viscosity of liquids in their various environments.

A still further and important object is to devise an instrument which may be readily adjusted to suit variability of requirements in respect to the measurement of the viscosity of different types of liquids.

A still further object is to provide a direct reading instrument which will enable instantaneous and continuous indication of the condition of the liquid.

The principal feature of the invention consists in the novel construction of a portable apparatus which may be suspended to be immersed to any desirable depth in a liquid and is provided with a rotatable element operable at predetermined speed in relation to a stator to apply a rotative force to the liquid to be tested so as to relatively affect the stator, causing it to be shifted in accordance with the relative values of viscosity and speed of rotation.

In the accompanying drawings, Figure 1 is an elevational part sectional view of a viscosimeter constructed in accordance with this invention.

Figure 2 is a plan section taken on the line 2—2 of Figure 1.

Figure 3 is a top plan view of the lower plate of the rotor illustrated in Figure 1.

Figure 4 is a top plan view of the middle plate of the rotor illustrated in Figure 1.

Figure 5 is a top plan view of the stator illustrated in Figure 1.

Figure 6 is an enlarged part sectional detail of the stator illustrating the shape of the spiral groove in the surface thereof.

Figure 7 is an enlarged vertical mid-sectional detail of the means for suspending the stator.

Figure 8 is a further enlarged cross section through the line 8—8 of Figure 7.

Figure 9 is a further enlarged cross section through the line 9—9 of Figure 7.

Figure 10 is a longitudinal sectional view of a portion of the lower end of a modified structure of rotor and stator.

Figure 11 is an underside plan view of the modified form of device.

Figure 12 is a top plan view of the modified form of stator shown in Figure 10.

Figure 13 is a side elevational view of the stator shown in Figure 12.

Figure 14 is an enlarged half section of a further modified form of rotor and stator.

Figure 15:
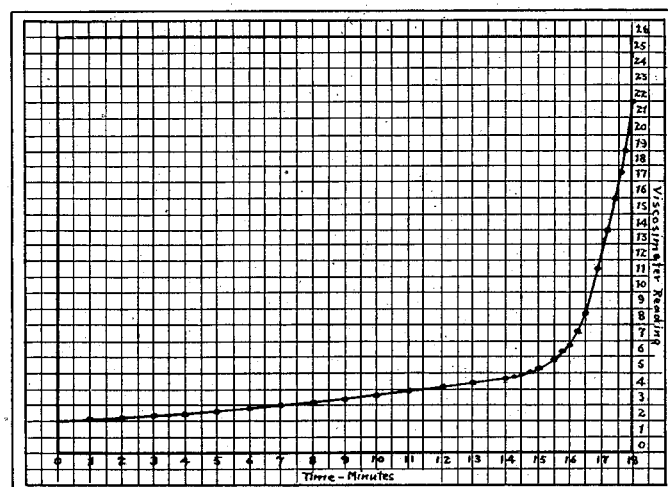
Figures 15, 16 and 17 are diagram charts illustrating viscosimeter readings for several fluids.

Numerous fields of industry are vitally interested in the measurement of the flowing characteristic of various substances and this condition varies from very thin plasticity to light fluidity due to the variable consistency of the materials.

Consistency may be defined as resistance to deformation or flow. Viscosity may be termed resistance to deformation or flow under an application of force and mobility of fluidity may be defined as the ease with which a material flows, consequently the greater the mobility the less the viscosity or plasticity of the substance.

The present invention is particularly adapted to the measurement of the viscosity of material of reasonably active mobility or fluidity as against what might be termed consistency or plasticity and many different forms of instruments have been devised in an attempt to obtain reasonably accurate measurements of the viscosity of fluid masses and the present invention may be defined as being of the tortion type, that is to say, one in which the action of a rotating member produces a result in proportionate relation to the viscosity of the material under test.

The form of device herein shown comprises a somewhat C-shaped frame 1 provided with a boss 2 having an eye member 3 by means of which the frame is suspended.

Upon the lower arm of the frame 1 there is provided a cylindrical portion 4, the axis of which is in alignment with the boss 2 and an outwardly extending bracket 5 supports a suitable type of motor 6 shown in dotted lines which is adapted to operate at a predetermined speed.

Within the cylinder 4 are arranged suitable bearings 7 and 8 which rotatably support a sleeve 9. The sleeve 9 is provided with a suitable spur gear 10 at the upper end which meshes with a suitable train of gears 11 and 12 which are operated by the motor 6 which therefore applies a definite rotative movement to the sleeve 9.

Upon the lower end of the sleeve 9 is mounted a suitable rotor structure, illustrated in Figures 1, 3, 4 and 5 as composed of an upper member 13 having a boss 14 mounted on the sleeve 9 and rigidly secured thereto, the bottom end of which flares outwardly in a disc form. The under face of the rotor member 13 is formed with a central cylindrical recess 15 and the bottom disc face is preferably formed with a spiral groove 16.

An intermediate disc member 17, shown in plan in Figure 4, is spaced from the spirally grooved lower face of the disc 13 having arranged around its perimeter, a plurality of spaced lugs 18 and the upper surface of the disc 17 is formed with a spiral groove 19.

The lower member 20 of the rotor is of disc form and is provided with an annular flange 21 which extends outside of and embraces the intermediate disc 17 and the upper disc 13 and an inwardly stepped flange 22 is formed inside of the flange 21 and engages the underside of the lugs 18 of the disc 17.

The three discs thus described are spaced apart and held in position by the bolts 23 which extend through the upper disc and through holes in the intermediate disc and are threaded into holes in the lower disc.

The inwardly stepped flange of the lower disc is formed with a plurality of equally spaced recesses 24 which open inwardly and holes 25 extend downwardly through the disc forming communicating passages to the outside.

Arranged between the recesses 24 are a plurality of equally spaced holes 26 extending through the stepped flange 22 which form a means of communication from the outside of the lower disc to the space between the upper and intermediate discs, as is illustrated particularly in the left-hand side of Figure 1.

A stator member in the form of a disc 27 is arranged intermediately between th spirally grooved bottom space of the upper disc 13 and the spirally grooved upper face of the intermediate disc 17, both the upper and lower faces of said stator disc being formed with spiral grooves 28 having inwardly facing shoulders 28'.

The stator disc 27 is formed with a central boss 29 which is here shown mounted upon a tapered member 30 which is rigidly secured to a rod 31 which extends upwardly axially of the sleeve 9.

A centering pin 32 is secured in the centralized member 33 of the lower rotor disc 20. The rod 31 is formed with a longitudinal slot 34 which extends radially inward from the periphery to a point past the axis and adjacent to the lower end of this slot which extends downwardly from the top of the rod to a point fairly close to the bottom, is secured a pin 35, several holes 36 being provided for the adjustment of this pin.

A tortion wire 37, preferably piano wire of a suitable diameter, is threaded through holes in the pin 35 which anchor it securely and the said wire extends upwardly of the slot 34 and is steadied at the top of the rod in a central position by a cap 38 mounted on the top end of the slotted rod. This wire suspends the stator in a spaced position within the rotor.

The upper end of the wire 37 is secured to a pin 39 mounted transversely of a threaded stem 40 which is threaded into a sleeve 41 mounted in the boss 2 of the frame 1, which sleeve is here shown secured in position by means of a nut 42 threaded on its upper end.

A ferrule 43 is placed over the lower end of the threaded stem 40 to retain the transverse pin 39 in place. The threaded stem 40 has mounted thereon a disc 44 which is provided with suitable indicia to indicate its position relative to the frame arm and said disc is flexible and frictionally engages a spot on the frame arm and acts as a brake to hold the stem 40 and elements connected therewith in adjusted positions under the clamping pressure of a lock nut 45 here shown threaded on the stem 40. A suitably knurled disc 46 is secured to the stem to enable it to be adjusted.

A tube 47 snugly encircles the rod 31 to enclose the wire slot and at the upper end of the tube there is secured a block 48 provided with a flange and upon this is mounted a horizontal drum 49 upon the perimeter of which suitable indicia are arranged which indicate the degree of viscosity of the liquid in accordance with the angle of rotation of the disc.

A lug 50 extends upward from the bracket 5 and carries a suitable indicating finger 51 arranged close to the perimeter of the drum 49. A suitable guard ring 52 is mounted on the frame 1 and is supported by the lug 50 to prevent interference with the operation of the indicating drum 49.

It will be seen that the stator mounted on the rod 31 is suspended on the tortion wire 37 and that any turning influence applied to the stator will be transmitted through the rod to the indicating drum.

A bracket 53 is arranged upon the frame 1 to extend upwardly above the cylinder 4 and it is provided with a boss 54 in which is mounted a tube 55 which is spaced from the rod 31 and is also spaced from the inner wall of the sleeve 9 and extends down to a point close to the hub of the stator disc. This tube is provided to protect the stator from the effect of any of the fluid material which might rise in the sleeve.

The sleeve 9 is provided with holes 56 arranged intermediate of its length to permit the escape of fluid or foam rising in the interior of the sleeve. A protecting cup 57 is mounted on the sleeve below the bottom end of the cylinder 4 to prevent oil or dirt from falling into the material that is being tested.

In the operation of this device it is suspended from the eye member 3 so that the rotor end is immersed in the fluid to be tested and it will be understood that the depth of immersion may be regulated as may be desired by raising and lowering the instrument.

The sleeve and the rotor attached thereto is rotated by the use of a synchronous motor at a desired speed in accordance with the material that is to be tested and the rotative motion of the rotor with its spirally grooved inner walls causes an inward flow of the fluid through the holes 26 and a thin film of the fluid floods over the top and bottom surfaces of the stator.

The stator is provided with a circular row of holes 58 and the fluid passing over the top of the stator flows through these holes downwardly and escapes from the space between the middle and bottom discs of the rotor through the recesses 24 and the holes 25.

The action of the spiral groove operates in the nature of a pump to cause the desired circulation of the fluid and the action of the fluid which is given a rotative motion has a rotating effect upon the stator in direct relation to its viscosity. This pumping effect is materially assisted by the centrifugal action of the fluid in the lower chamber of the rotor.

It will be readily appreciated that a thin liquid will flow around the stator with a relatively minor tortion movement and this movement will increase in direct relation to the viscosity of the fluid, thereby turning the rod 31 a predetermined degree in opposition to the tortional resistance of the wire 37 and through the medium of the indicating drum 49 a definite reading of the viscosity of the fluid will be obtained instantaneously.

It will of course be appreciated that there are many variables to be considered in a device of this kind which may be altered in accordance with the requirements, either in building several forms of instruments with different film gaps, film surfaces, etc., or considerable variation in adjustment may be made by altering the form of the rotor, by adjusting the speed of the rotor, by the adjustment of the length and the diameter of the tortion wire and selection of the material of which it is made, but when the desired adjustment is made and the instrument is immersed to the desired depth at the desired temperature of the liquid to be tested, the result will be accurate.

It will be understood that in the treatment of various liquids there will be conditions such as frothing, which might be detrimental to the indication of the rotor by the material frothing climbing around the rod supporting the stator, but this is obviated by the introduction of the guard tube 55 and the tendency of the fluid to rise within the tube is obviated by the provision of the holes 56 which allow any fluid rising therein to escape.

In the form of device illustrated in Figures 10 to 13 the rotor is illustrated as of cylindrical form the cylinder 59 being mounted upon the sleeve 9 and having a disc 60 spaced therefrom by the legs 61.

The stator in this form of the device is shown as of the form of a spiral gear wheel 62. The outer perimeter of this stator rotates in close proximity to the inner wall of the cylindrical member 59 and the fluid flows inwardly through holes 63 and is circulated downwardly between the teeth of the stator through the rotative action of the rotor and in so doing it applies a rotative influence on the stator in accordance with the viscosity of the fluid.

In the form of the structure illustrated in Figure 14 the stator 64 is substantially the same as shown in Figure 1, but has no central holes therethrough. The rotor is formed of a pair of discs 65, spirally grooved internally and which have inlet openings 66 and 67 leading from the top and bottom respectively of the outer portion, inwardly to a radial passage 68. The spiral grooves of the rotor and stator actuate to draw the fluid inwardly and the inflow is discharged outwardly through holes 69 in the rotor discs into the annular spaces 70 formed by the disc flanges 71 and the fluid is discharged centrifugally from the spaces 70. This construction overcomes any surging due to turbulence created by agitation of the fluid.

The device herein described has been developed following a careful study of the type of instruments which have been previously proposed and has been found to be extremely reliable and effective. Mechanical friction between the rotor and stator members is reduced to a negligible quantity and the device can be readily moved about from place to place and suspended with great ease and facility in the commercial equipment where liquids are being treated.

It will be appreciated that as the device can be immersed in the material and the stator is affected constantly by the material flowing through the rotor, a reading of the condition may be obtained at any instant in operation. Further the reading will be indicated directly upon the instrument from the calibrated drum. It is found in actual practice that this device will give accurate readings for liquids ranging from comparatively low viscosity to thick heavy material of high viscosity.

An important factor in the very marked success of the present device lies in the use of a disc type of rotor and stator as against the cylinder type which has been previously proposed resulting in the material reduction of inertia and it is found that the type as herein described produces a result where "hunting" of the stator is reduced to the minimum and consequently practically instantaneous reading may be obtained.

The chart illustrated in Figure 15 shows the viscosimeter readings of the viscosity change which takes place during an 18 minute period concluding the boiling period of a synthetic resin where readings were taken every minute and an extremely accurate knowledge of the condition of the material is shown.

Figure 16:
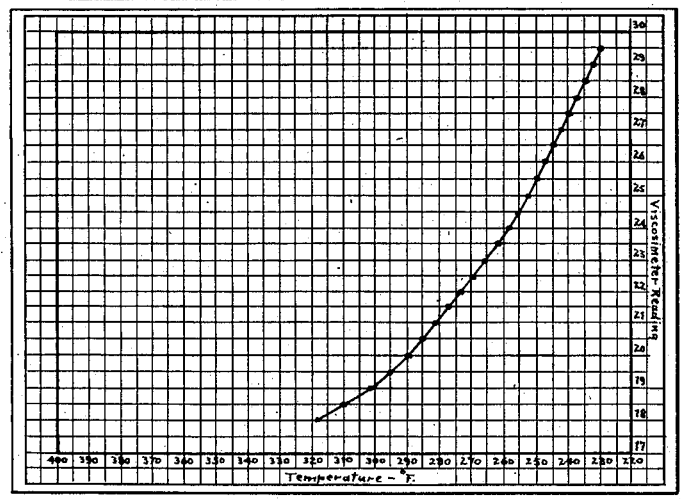

Figure 16 shows a chart of the viscosity of raw linseed oil taken at temperatures varying from 320° F. to 230° F.

Figure 17:
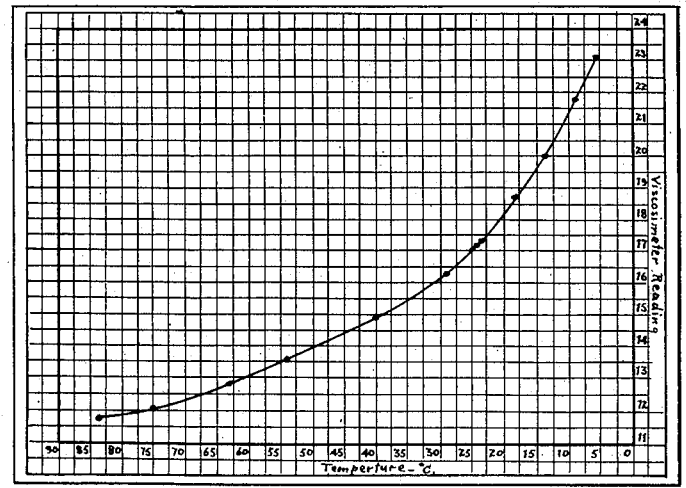

Figure 17 shows a chart of the viscosity of water taken at temperatures varying from 83° C. to 5° C.

The above charts illustrate very definitely the sensitivity, accuracy and wide range of use of a viscosimeter constructed in accordance with this invention.

What we claim as our invention is:

1. A viscosimeter comprising, a frame, a sleeve rotatably supported in said frame, a motor for driving said sleeve, a hollow rotor mounted on said sleeve having liquid circulating passages therethrough, a stator member arranged within said hollow rotor, a rod secured to and supporting said stator having a longitudinal slot, a pin secured in said slot intermediate of the length of said rod, a tortion wire secured to said pin and extending upwardly beyond said rod, means secured to said frame for suspending said tortion wire, and means for indicating the tortional deflection of said stator.

2. A viscosimeter comprising, a frame, a sleeve rotatably supported in said frame, a motor for driving said sleeve, a disc rigidly secured to the lower end of said sleeve, a disc secured to and spaced from the aforesaid disc having openings leading to the perimeter of said space and an opening leading from the centre of said space, a stator disc suspended in said space having spirally grooved faces, a rod supporting said stator disc, a tortion wire connected with said frame and connected to and suspending said rod, and an indicator mounted on said rod.

3. A viscosimeter as claimed in claim 2 having the inner faces of the upper and lower discs formed with spiral grooves.

4. A viscosimeter as claimed in claim 2 having a third disc secured to the spaced discs carried by said sleeve, the latter disc having passages leading to the inflow passages leading to the perimeter of the upper space and passages communicating with the centre passage of the lower disc, and a steadying bearing member for the stator mounted in the bottom disc.

5. A viscosimeter comprising, a frame, a sleeve rotatably supported in said frame, a motor for driving said sleeve, a hollow rotor mounted on said sleeve having liquid circulating passages therethrough, a stator member arranged within said hollow rotor, a tortion suspension member connected at spaced points respectively with the frame and stator and supporting said stator, a tube carried by the frame and surrounding said tortion member within and spaced from the inner wall of said rotor sleeve, and extending upwardly from a point closely adjacent the stator to minimize detrimental contact of the fluid under test with said tortion suspension member, and means for indicating the tortional deflection of said stator relative to the frame.

6. A viscosimeter comprising, a frame, a sleeve rotatably supported in said frame, a motor for driving said sleeve, a hollow rotor mounted on said sleeve having liquid circulating passages therethrough, a stator member arranged within said hollow rotor, a tortion suspension member connected at spaced points respectively with the frame and stator and supporting said stator, and a tube secured at its upper end in the frame and surrounding said tortion member, said tube extending into close proximity to said stator and spaced from the inner wall of said rotor sleeve to protect said tortion member against detrimental contact with the fluid under test, said rotor sleeve having openings therethrough intermediate of its length below the upper level of said tube and adapted to provide free outlet for fomentation collecting between said tube and sleeve.

7. A viscosimeter comprising a frame, a sleeve rotatably supported in said frame, a motor for driving said sleeve, a hollow disc-shaped rotor having radial passages leading to a central chamber and outlets from the inner chamber adjacent the centre leading to annular outlets discharging at the perimeter, a stator member arranged within the central chamber in said rotor, a tortion suspension member connected at spaced points respectively with the frame and stator and supporting said stator, and indicator means connected with by the tortion member.

8. A device as claimed in claim 7 in which disc flanges are arranged above and below the hollow disc portion of the rotor to form the annular discharge outlets.

9. A viscosimeter as claimed in claim 1 in which said rod is formed with a plurality of transverse openings intersecting said longitudinal slot adapted to adjustably receive said pin to provide a variable anchorage for said tortion wire.

10. A viscosimeter as claimed in claim 1 in which said longitudinal slot accommodates said wire within the perpihery of said rod, and a tube snugly encircles the rod and closes the slot and locks the pin therein.

11. In a viscosimeter the combination of a rotor and a stator of substantial disk-like form having closely co-operating surfaces forming passages for the fluid under test, and means forming an inlet and an outlet for the fluid to and from said passages, said co-operating surfaces being substantially confined closely adjacent a plane right-angularly intersecting the rotor axis and being formed in part at least of spiral formation having the spiral convolutions encircling each other with the pitch leading in a direction to impel a definite flow of the fluid through said passages whereby the rotor and stator may be submerged in a shallow body of fluid to be tested and to enable uniformly accurate viscosity tests of deep or shallow bodies of fluid.

12. Means as claimed in claim 11 in which said co-operating surfaces diverge radially inward from the inlet to the outlet.

13. In a viscosimeter, a tortionally deflectable stator and rotor forming colletively a relatively thin disc-like unit capable of being submerged in a shallow body of fluid to be tested and spaced an accurate predetermined distance apart to define therebetween a constricted fluid passage of extensive surface area extending in close proximity to a plane right-angularly intersecting the rotor axis, and means for causing the fluid under test to advance between said extensive surfaces from the peripheral region to the axial region.

14. In a viscosimeter, a tortionally deflectable stator and rotor forming collectively a relatively thin disc-like unit capable of being submerged in a shallow body of fluid to be tested and spaced an accurate predetermined distance apart to define therebetween a constricted fluid passage of extensive surface area extending in close proximity to a plane right-angularly intersecting the rotor axis, and means for causing the fluid under test to advance between said extensive surfaces from the peripheral region to the axial region, including a spiral groove in one of said surfaces the lead of which is from the peripheral region to the axial region as the rotor operates.

15. A viscosimeter comprising, a frame, a sleeve rotatably supported in said frame, a rod, means suspending said rod from the frame for tortional deflection relative to the frame and axially in said sleeve, a thin disc-like stator mounted on said rod and formed with spirally grooved surfaces, a hollow rotor mounted on said sleeve of thin hollow disc-like form enclosing said stator and having spirally grooved top and bottom surfaces conforming to and closely spaced from the spirally grooved surfaces of said stator, the spirals of at least one of said grooved surfaces leading inwardly from the periphery to a point closely adjacent the axial region to impel the liquid under test between the peripheral and axial regions with the minimum of travel in a direction axially of the rotor.

16. A viscosimeter as claimed in claim 15 in which the spiral grooves are formed in cross section with inner side walls which diverge outwardly relative to the surfaces while the outer walls are disposed substantially perpendicular to the said surfaces to present inwardly faced shoulders to engage the liquid to direct it inwardly over the stator.

17. A viscosimeter comprising driving and driven co-axial disc members formed with closely co-operating surfaces, the space between the members forming a passageway through which liquid may pass, and means for actuating the driving member, the face of the driving member which co-operates with the driven member being spirally ribbed to draw liquid through said passageway to frictionally impart a rotary force to the driven member.

18. A viscosimeter comprising a driving member formed of two discs and a driven disc member co-axially mounted between the aforesaid discs, both driving and driven discs being formed with closely co-operating surfaces, the space between the members forming a passageway through which liquid may pass, and means for actuating the driving member, the inner sides of the discs of the driving member which co-operate with the driven member being ribbed to draw liquid through said passageway to frictionally impart a rotary force to the driven member.

RUDOLF D. DELAMERE.
WILLIAM M. HUTCHEON.